(12) United States Patent
Daga

(10) Patent No.: US 6,877,139 B2
(45) Date of Patent: Apr. 5, 2005

(54) AUTOMATED APPROACH TO CONSTRAINT GENERATION IN IC DESIGN

(75) Inventor: Ajay Janami Daga, Lake Oswego, OR (US)

(73) Assignee: Fishtail Design Automation Inc., Lake Oswego, OR (US)

( * ) Notice: Subject to any disclaimer, the term of this patent is extended or adjusted under 35 U.S.C. 154(b) by 102 days.

(21) Appl. No.: 10/390,194

(22) Filed: Mar. 14, 2003

(65) Prior Publication Data

US 2003/0177463 A1 Sep. 18, 2003

Related U.S. Application Data

(60) Provisional application No. 60/365,749, filed on Mar. 18, 2002.

(51) Int. Cl.[7] .............................................. G06F 17/50
(52) U.S. Cl. .............................................. 716/1; 716/6
(58) Field of Search ......................................... 716/1, 6

(56) References Cited

U.S. PATENT DOCUMENTS 5,896,299 A  * 4/1999  Ginetti et al. .................. 716/4
6,658,628 B1 * 12/2003 Landy et al. .................. 716/1

OTHER PUBLICATIONS

U.S. Provisional application No. 60/365,749, Ajay Janami Daga.

* cited by examiner

*Primary Examiner*—Vuthe Siek
*Assistant Examiner*—Sun James Lin
(74) *Attorney, Agent, or Firm*—Donald R. Boys; Central Coast Patent Agency, Inc.

(57) ABSTRACT

A software-based system for generating timing constraints for a proposed IC design has a first input as a synthesizable description of the proposed IC, a second input as a clock specification for the proposed IC, and a processing unit accepting the first and second inputs, and determining therefrom as an output, a set of timing constraints to guide implementation of the proposed IC design.

22 Claims, 5 Drawing Sheets

(Start)

```
module add_mul (clk, reset, a, b, c, d, in_sel, op_sel, x, y);
input clk, a, b, c, d, in_sel, op_sel, reset;
output x, y;
reg x, y, count, latch_en, r_a, r_b, r_c, r_d, r_op_sel, r_in_sel;
wire r_x, r_y, a_c, b_d, add, mul, add_mul;
always @ (posedge clk or posedge reset)
begin
  if (reset) begin
    count <= 0;
    latch_en <= 0;
    r_a <= 0;
    r_b <= 0;
    r_c <= 0;
    r_d <= 0;
    r_op_sel <= 0;
    r_in_sel <= 0;
  end
  else begin
    if (!count) begin
      r_a <= a;
      r_b <= b;
      r_c <= c;
      r_d <= d;
      r_op_sel <= op_sel;
      r_in_sel <= in_sel;
      if (op_sel)
        count <= count + 1;
      else
        latch_en <= 1'b1;
    end
    else begin
      count <= 0;
      latch_en <= 1'b1;
    end
  end
end
```

(Continued from Fig. 2a)

```
assign a_c = r_in_sel ? r_a : r_c;
assign b_d = r_in_sel ? r_b : r_d;
assign add  = a_c + b_d;
assign mul = a_c * b_d;
assign add_mul = r_op_sel ? mul : add;
assign r_x = r_in_sel ? add_mul : x;
assign r_y = r_in_sel ? y : add_mul;
always @ (posedge clk  or posedge reset)
begin
   if (reset) begin
      x <= 0;
      y <= 0;
   end
   else if (latch_en) begin
      x <= r_x;
      y <= r_y;
   end
end
endmodule
```

(END)

*Fig. 2b* read_design add_mul.v
link_design
create_clock clk200 -period 5 –net { clk }
write_sdc add_mul.sdc

*Fig. 3*

Clock Definitions set clk200_source_pins { }
set clk200_source_nets [get_nets { clk } ]
set clk200_source_pins [add_to_collection $clk200_source_pins \
    [get_pins -of $clk200_source_nets]]
create_clock -name clk200 -period 5 -waveform { 0 2.5 }
$clk200_source_pins

Exceptions for endpoints clocked by clk200 set_multicycle_path -through [get_nets mul] -setup 2
set_multicycle_path -through [get_nets mul] -hold 1
set_false_path -through [get_nets r_c] -through [get_nets r_x]
set_false_path -through [get_nets r_d] -through [get_nets r_x]
set_false_path -through [get_nets r_a] -through [get_nets r_y]
set_false_path -through [get_nets r_b] -through [get_nets r_y]

*Fig. 4*

AUTOMATED APPROACH TO CONSTRAINT GENERATION IN IC DESIGN

CROSS REFERENCE TO RELATED DOCUMENTS

The present non-provisional patent application claims priority to provisional application Ser. No. 60/365,749, filed on Mar. 18, 2002. The entire disclosure of provisional application No. 60/365,749 is incorporated herein by reference.

FIELD OF THE INVENTION

The present invention is in the technical area of integrated circuit (IC) design, and pertains more specifically to Electronic Design Automation (EDA) tools providing methods and apparatus for generating timing constraints in a design project.

BACKGROUND OF THE INVENTION

The term integrated circuit (IC) is a very general term covering a very broad range of electronic devices based on solid-state electronics, such as microprocessors. It is now notoriously well-known that a vast array of consumer products, especially those products in the area of telecommunications and computerized devices (including personal computers), are based on ICs, such as central processing units (CPUs), microprocessors, and, of course, digital memory devices of many sorts.

In the art of IC design and manufacturing, ongoing research and development in a highly competitive environment is conducted to produce new and better devices, which are manufactured by usually well-know techniques involving many ways of treating semiconductor materials (wafers), applying thin-film materials, patterning, and selectively removing materials to create highly concentrated matrices of interconnected semiconductor elements, such as transistors, providing, in the end, minute, complex circuitry to perform specific tasks of computation and logic with almost unbelievable rapidity and reliability.

Also typically, in the manufacturing process, many ICs are formed on a single wafer. After what is termed in the art the "front-end" processing, during which the ICs are formed, the individual ICs are separated into discrete units termed chips in the art, which may then be packaged and used in a wide variety of ways for different products and purposes.

When developmental engineers conceive a new chip, it is of course necessary to lay out all of the circuits that will accomplish the purposes, which amounts to placing all transistors, resistors, and other devices, and plotting the interconnections that complete the circuitry. In the very early days of chip design this was a relatively straightforward process, at least a lot more straightforward than it is today. The trend in design, however, has always quite naturally been to faster and faster operation (clock speed), higher and higher density (area needed for circuitry), and lower power consumption to attain maximum computing or storage power in the least possible space. The speed motivation is obvious. Part of the density motivation is dictated by space and volume requirements in product design, and part by cost considerations. More good chips per wafer drives the cost per part down.

As need for density and speed steadily increase, new challenges arise in IC design. For example, specific manufacturing techniques, lithography for example, are always limited to such as minimum spacing of elements on a chip, line width in interconnects, and the like, and to achieve higher density it is often necessary to invent new processing techniques or improvements in older techniques. Likewise, even though higher density has a usually beneficial effect on speed capability (devices are connected closer together), allowing higher operating rate (clock speed), there are always limitations associated with device structure, materials, and the like, to speed as well, and achieving higher and higher speed involves new inventions and discoveries in materials, combinations of materials, structures of devices, and so on.

It therefore becomes apparent that a circuit diagram is only a starting point in a new IC design, even though massive computing engines are needed even for this seminal part of a design. Given stringent requirements for a new design for speed, density, and power consumption, development engineers have to pick very carefully among many alternatives for materials, processes, film characteristics and thicknesses, interconnection alternatives, and much more; and the selections one makes almost always influence other possible selections and decisions, as all are intimately related.

Still, even in the face of the complexity of the task, small market windows and short product lifecycles provide no room for error in the execution of chip design projects—schedule slippage is measured not just in terms of additional R&D costs, but in lost market opportunities that can be fatal for a company. Integrated circuit designers are therefore under tremendous pressure to design complex chips to meet design and marketing requirements.

The design of complex multi-million-transistor chips requires the pervasive use of electronic design automation (EDA) software tools. These tools are used to take high-level descriptions of designs in languages that are very similar to programming languages and yield, through a series of complicated steps, the final mask for a chip. This flow is referred to as RTL to GDS-II (RTL is the initial design description in Verilog, VHDL and GDS-II is the mask for chip manufacturing).

To counter the risk of designs not converging on requirements, engineers use virtual prototyping tools, a type of EDA tool, to estimate downstream chip implementation characteristics (speed, area, power) from early design descriptions. The intent is to get an early gauge of design feasibility. Virtual prototyping tools have garnered significant interest in the design community, and virtual prototyping is among the fastest growing of EDA market segments.

Virtual prototyping tools arguably provide reasonable estimates of delays along timing paths on a chip. The feasibility of a design, however, hinges on whether these delays are actually within acceptable bounds. Without good constraints on the permissible delays for the millions of timing paths on a chip, virtual prototyping tools are insufficient to gauge actual design feasibility. Absence of good timing constraints early in the design flow also results in chip implementation tools (logic synthesis, place & route) being asked to meet requirements that are both unnecessarily stringent and uncertain. This severely impacts ability of such tools to generate low-cost, low-power implementations that meet performance requirements without requiring design iterations.

What is clearly needed is a tool that starts with the fundamental speed performance requirements for an IC to be designed, i.e. its clock speed, and by examining the intended functionality of the new chip in regard to how it will be clocked is capable of precisely identifying and constraining acceptable delays of timing paths on the new chip. Such a tool could generate golden timing constraints that must be obeyed for the finished chip to operate at its intended clock speed. Fundamental to the golden timing constraints for a chip is that they describe not only the bounds on path delays that are established by the clock requirements of a chip, but that they also identify paths on a chip where clock requirements are relaxed. The relaxation of clock requirements is referred to in the industry as "exceptions to single-cycle clocking". The automatic identification of the exceptions to single-cycle clocking is fundamental to the generation of the golden timing constraints for a chip.

The golden constraints, once determined, could then be used to drive existing virtual prototyping tools, logic synthesis tools, and place & route tools. The use of the golden constraints could, because of the automatically generated exceptions to clock requirements, then empower chip design without expensive and time consuming iterations, while also yielding chips that consume less area, less power, or, if required, run faster than was thought possible.

A unique and innovative software system, called Focus by the inventors, for developing such golden timing constraints in IC design is taught in enabling detail in the descriptions of preferred embodiments below.

SUMMARY OF THE INVENTION

In a preferred embodiment of the present invention a software-based system for generating timing constraints for a proposed IC design is provided, comprising a first input as a synthesizable description of the proposed IC, a second input as a clock specification for the proposed IC, and a processing unit accepting the first and second inputs, and determining therefrom as an output a set of timing constraints to guide implementation of the proposed IC design.

In preferred embodiments, the processing unit, in determining the timing constraints, determines exceptions to single-cycle clocking for the proposed IC design. Further, in a preferred embodiment the exceptions include false paths and multi-cycle paths. Output in a preferred embodiment is provided in Synopsys Design Constraint (SDC) format useable by one or more of virtual prototyping, logic synthesis, place & route, and static timing tools in design implementation. The IC may be of any of many sorts, including application-specific integrated circuits (ASIC) or field-programmable gate arrays (FPGA).

In one aspect of the invention the first and second inputs and output timing constraints may be for an individual functional block on an IC instead of for the entire IC. In another aspect the first and second inputs and output timing constraints may be for paths between functional blocks on an IC. In the latter case the results may be used to partition overall IC timing requirements into block timing budgets.

In preferred embodiments the synthesizable description is provided as one of Verilog or VHDL format. In other embodiments the first input may be derived from a .lib model, and converted into one of Verilog or VHDL format. In one embodiment a facility is provided for a user to manually refine an automatically-generated model by adding functional detail. In various embodiments, as a part of clock specification, users may define the clocks, their periods, their phase shifts relative to a reference clock, and the nets on the design to which a clock is applied.

In another aspect of the invention a method for guiding an implementation phase for a proposed IC design is provided, comprising the steps of (a) providing to a processing unit as a first input a synthesizable description of the proposed IC; (b) providing as a second input to the processing unit clock specification for the proposed IC; and (c) using the first and the second inputs by the processing unit to determine therefrom, as an output, a set of timing constraints to guide implementation of the proposed IC design.

In preferred embodiments of the method, in step (c), the processing unit, in determining the timing constraints, determines exceptions to single-cycle clocking for the proposed IC design. The exceptions may include false paths and multi-cycle paths.

Also in preferred embodiments of the invention the output is provided in Synopsys Design Constraint (SDC) format useable by one or more of virtual prototyping, logic synthesis, place & route, and static timing tools in design implementation. The method in preferred embodiments is applicable application-specific integrated circuits (ASICs) or field-programmable gate arrays (FPGAs), as well as to many other sorts of ICs.

In some cases the first and second inputs and output timing constraints may be for an individual functional block on an IC instead of for the entire IC. Also in some cases the first and second inputs and output timing constraints are for interaction paths between functional blocks on an IC, and may be used to partition overall IC timing requirements into block timing budgets.

In preferred embodiments the synthesizable description is provided as one of Verilog or VHDL format. In other embodiments the first input may be derived from a .lib model, and converted into one of Verilog or VHDL format. Further, there may be a facility provided for a user to manually refine an automatically-generated model by adding functional detail.

In other embodiments of the present invention, as part of the clock specification, users define the clocks, their periods, their phase shifts relative to a reference clock, and the nets on the design to which a clock is applied.

The Focus system, as summarized above, provides significant advantages in IC design, by providing:

A reduction in the risk of design failures by providing engineers an early understanding of the precise challenges they face in realizing a design. By providing virtual-prototyping tools with golden timing constraints, the Focus system empowers the tools to create more realistic block timing budgets. Correct block implementation constraints, in turn, reduce the risk of design iterations.

A reduction in the cost and power consumption of a design. By generating timing constraints that do not over-constrain a design, the Focus system allows block implementation tools to generate circuits that consume as little area and power as possible, while meeting performance objectives. Reduction in IC area typically translates to a reduction in unit costs. Reduction in power consumption is crucial for several consumer products.

A reduction in IC design time by automating a task that is central to IC design. Engineers conventionally specify timing constraints in an ad-hoc and continually evolving manner. As timing problems are uncovered, and most of them tend be uncovered late in the implementation flow, exceptions to single-cycle clocking are inserted. All of this takes time, is error-prone and is the source of much anxiety during IC sign-off.

The Focus system empowers an RTL-handoff-based design flow. With the Focus system, system design houses are able to describe the design they want to implement and hand this design, along with its constraints, to a semiconductor vendor that will take responsibility for implementing the design to meet requirements. Semiconductor vendors typically prefer RTL handoff because it allows them to take responsibility for a greater portion of the design flow. System design houses prefer RTL handoff because it allows them to focus on their core competency, which is the design of compelling products.

In embodiments of the invention described in enabling detail below, for the first time a system is provided that allows users to identify false and multi-cycle paths ahead of implementation of a proposed design, and to use timing constraints determined therefrom in implementing the proposed design.

BRIEF DESCRIPTION OF THE DRAWINGS FIGURES

FIG. 2a is a first part of an example of a synthesizable description furnished as input to the system in an embodiment of the present invention.

FIG. 2b is a final part of the example for which the first part is FIG. 2a.

FIG. 3 illustrates a clock specification input to the Focus system in an embodiment of the present invention.

FIG. 4 is an SDC file generated for the example design described below with reference to FIGS. 2a, 2b, and 3 in an embodiment of the present invention.

DESCRIPTION OF THE PREFERRED EMBODIMENTS

Figure 1:
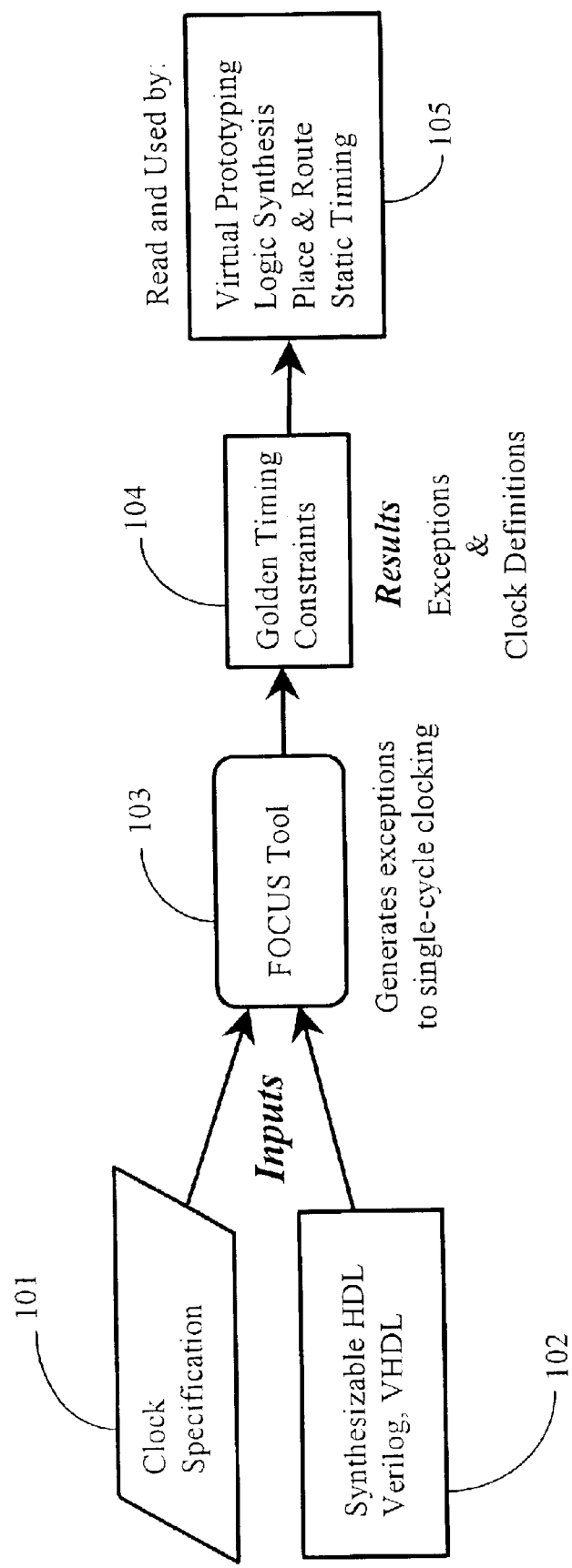
FIG. 1 is a block diagram illustrating overall operation of Focus system 103 in a preferred embodiment of the present invention.

The system of the present invention, in a preferred embodiment, is a software-enabled system that automatically (i.e. without user-specified stimulus), analyzes a cycle-accurate description of interaction among functional blocks on a proposed IC, to generate timing constraints that must be satisfied by the IC to meet design requirements.

It is well-known that there are, broadly speaking, two historically distinct stages in the creation of a new IC: (1) the design stage, and (2) the implementation stage. The system of the invention, termed Focus by the inventors, links the two stages for the first time by establishing constraints imposed on the implementation stage by facts and characteristics of the design stage.

It is well-known that development engineers constrain the delays on the timing paths of a proposed IC based on the speed at which they intend to clock the IC. The engineers specify the clocks on their design and every timing path on the IC is required to have a delay less than the clock cycle. Known IC implementation tools strive to reduce path delays so that they are less than a clock cycle. There are, however, large numbers of timing paths in almost any design that are not relevant, that is, the functionality of the IC is such that the delay on these paths does not matter. These paths are typically termed *false paths*, although they are false only in terms of the fact that the delay does not matter. There are also typically a significant number of timing paths on a proposed IC wherein, by design, engineers provide extra time to perform complex operations. These paths are termed *multi-cycle paths*. False and multi-cycle paths are collectively referred to as *exceptions to single-cycle clocking*.

The present inventors have determined that the critical timing constraints for an IC are defined by the clocks and exceptions to single-cycle clocking. At the time of filing the present patent application, it is known that engineers do not typically specify exceptions to clocking at the start of design flow. Instead, the engineers respond to timing problems reported by conventional IC implementation tools and, based on communication between design and verification engineers, establish whether a timing problem is real or needs to be handled by adding a timing exception to the constraint file for a design. This conventional process is an error-prone, time-consuming, process that continues throughout IC implementation flow, and compounds errors in the overall process.

Overview

FIG. 1 is a block diagram illustrating overall operation of Focus system 103 in a preferred embodiment of the present invention. The Focus system, as shown by the flow of FIG. 1, takes as inputs the synthesizable description for a design for an IC (102) and a specification for how the design is clocked (101). Without requiring any other information, the Focus system generates exceptions (false paths, multi-cycle paths) to single-cycle clocking. By automatically identifying exceptions to clock requirements, the Focus system relaxes the timing goals that an IC implementation must to obey. These exceptions and the user-provided clock definitions constitute golden timing constraints 104 for an IC under consideration. These constraints are written out in the industry standard Synopsys Design Constraint (SDC) format and are read and used by virtual prototyping, logic synthesis, place & route, and static timing tools, as shown in block 105.

Applications in Design Flow

The Focus system is applicable to at least any digital application-specific integrated circuit (ASIC) or field-programmable gate array (FPGA) design and implementation. The Focus system is applicable as well for both synchronous and asynchronous designs. Focus is also applicable for the design of large and complex SoCs that contain 10 million or more gates and run at clock speeds in excess of 300 megahertz (MHz), as well as for the design of FPGAs containing less than a million gates that run at speeds up to 100 MHz or more. Further, the Focus system may be used to constrain and drive the implementation of individual blocks within an IC, as well as the entire IC.

Considering the full IC, the Focus system is used to generate the golden timing constraints that constrain the interaction among blocks on the IC. These constraints are then imported by such as virtual prototyping tools, and used to partition overall IC timing requirements into block timing budgets that establish when information is available at the inputs of a block and when information must be available at the outputs of a block.

Considering IC block implementation flow, the Focus system generates the golden timing constraints for the internal implementation of a block. These block constraints, along with the block timing budgets generated using the Focus system and virtual prototyping tools, may be used to drive block implementation tools such as logic synthesis tools, place & route tools, and static timing tools.

The Focus system in preferred embodiments is plug-and-play in existing design flow. Therefore engineers do not need to alter the way they do design, and they need to provide only minimal new information to the Focus system. The information the Focus system requires, which is substantially synthesizable design descriptions and clock specifications, is already at hand at the start of IC implementation flow. The information the Focus system generates is generated in a standard form (SDC) that is accepted across the industry by major EDA players and start-ups alike. The Focus system does not replace existing design tools, it simply makes them more effective.

Synthesizable Description Input (102 of FIG. 1)

The Focus system takes as input the synthesizable description for an IC design and a specification of the clocks on the design. The synthesizable description for a design is provided as input to Focus in Verilog or VHDL format, both of which are well-known to the skilled artisan. All conventional synthesizable constructs in these languages are supported by the Focus system. Information for blocks on an IC design that do not have synthesizable descriptions, such as for external hard IP blocks, embedded memory, or user-instantiated library cells, for example, is provided as input to the Focus system using one of two approaches:

1) Users can provide a .lib model for the block as input. This model describes black-box timing relationships between pins on the block. This model is converted into a behavioral HDL model (Verilog or VHDL format) that captures the timing relationships between pins on an IP block. Users can refine this auto-generated model manually by adding functional detail.

2) Alternatively, IP providers can use a known product known as Reduce from FishTail Design corporation to generate an interface-logic model (ILM) from a synthesizable description for an IP block. This interface-logic model, generated in Verilog or VHDL format, may be used as input to Focus in lieu of the full synthesizable description for a block.

The constraints for a design can be generated using either a flat or hierarchical methodology. In a flat methodology, the Verilog and VHDL files for the full design are read into the Focus system. An example input as synthesizable description is illustrated in FIGS. 2a and 2b, as the example is too large for a single drawing sheet. In a hierarchical methodology, individual blocks on the design are analyzed separately and ILM descriptions for these blocks are used when analyzing the full-chip.

Clock Specification Input (101 of FIG. 1)

In addition to the synthesizable description for a design, as described in examples above, to apply the Focus system users need to specify the clocks on the proposed IC design. As part of their clock specification users define the clocks, their periods, their phase shifts relative to a reference clock, and the nets on the design to which a clock is applied. FIG. 3 illustrates a clock specification input to the Focus system in an embodiment of the present invention.

Focus Analysis (103 of FIG. 1)

Given both the synthesizable description for an IC design and a specification for the clocks on the design, the Focus system proceeds to automatically identify false and multi-cycle paths. This analysis is performed without synthesizing the design description into a gate-level netlist. Instead, functional abstraction is performed on the design to only preserve the functional detail necessary for the purposes of computing false and multi-cycle paths, while discarding superfluous functional detail. Symbolic simulation is performed on the functionally abstracted design to ensure that the analysis is exhaustive and is performed without requiring user-specified stimulus. Functional abstraction helps ensure that the entire space of possible behaviors on a design can be symbolically simulated in a computationally feasible manner that scales to handle large designs.

Generated by Focus—Golden Timing Restraints (104 of FIG. 1)

The user-specified clocks and the false and multi-cycle paths identified a and determined by the Focus system are written out (output) in Synopsys Design Constraint (SDC) format to a text file. The information in this text file constitutes the golden timing constraints for an IC design. IC implementation tools such as virtual prototyping, logic synthesis, place & route and static timing (105 of FIG. 1) import these constraints. The SDC file generated for the example design is shown in FIG. 4.

It will be apparent to the skilled artisan that there will be a variety of alterations that may be made in embodiments of the invention described herein without departing from the spirit and scope of the invention. For example, there are generally a number of different ways that a software application may be written to accomplish similar or the same purposes, and there are typically also a variety of programming languages that may be used to create software for a system such as that described in preferred embodiments in the present specification. For these and other reasons the invention should be limited only by the scope of the claims that follow:

What is claimed is:

1. A software-based system for generating timing constraints for a proposed IC design, comprising:

a first input as a synthesizable description of the proposed IC design;

a second input as a clock specification for the proposed IC design; and a processing unit accepting the first and second inputs, and determining therefrom as an output a set of timing constraints to guide implementation of the proposed IC design;

wherein the processing unit, in determining the timing constraints, determines exceptions to single-cycle clocking for the proposed IC design.

2. The system of claim 1 wherein the exceptions include false paths and multi-cycle paths.

3. The system of claim 1 wherein the output is provided in Synopsys Design Constraint (SDC) format useable by one or more of virtual prototyping, logic synthesis, place & route, and static timing tools in design implementation.

4. The system of claim 1 wherein the proposed IC design is one of an application-specific integrated circuit (ASIC) or a field-programmable gate array (FPGA).

5. The system of claim 1 wherein the first and second inputs and output timing constraints are for an individual functional block on an IC instead of for the entire IC.

6. The system of claim 1 wherein the first and second inputs and output timing constraints are for paths between functional blocks on an IC.

7. The system of claim 6 wherein results are used to partition overall IC timing requirements into block timing budgets.

8. The system of claim 1 wherein the synthesizable description is provided as one of Verilog or VHDL format.

9. The system of claim 1 wherein the first input is derived from a .lib model, and converted into one of Verilog or VHDL format.

10. The system of claim 9 wherein a facility is provided for a user to manually refine an automatically-generated model by adding functional detail.

11. The system of claim 1 wherein, as part of the clock specification users define the clocks, their periods, their phase shifts relative to a reference clock, and the nets on the proposed IC design to which a clock is applied.

12. A method for guiding an implementation phase for a proposed IC design, comprising the steps of:

(a) providing to a processing unit as a first input a synthesizable description of the proposed IC design;

(b) providing as a second input to the processing unit clock specification for the proposed IC design; and (c) using the first and the second inputs by the processing unit to determine therefrom, as an output, a set of timing constraints to guide implementation of the proposed IC design, wherein, the processing unit, in determining the timing constraints, determines exceptions to single-cycle clocking for the proposed IC design.

13. The method of claim 12 wherein the exceptions include false paths and multi-cycle paths.

14. The method of claim 12 wherein the output is provided in Synopsys Design Constraint (SDC) format useable by one or more of virtual prototyping, logic synthesis, place & route, and static timing tools in design implementation.

15. The method of claim 12 wherein the proposed IC design is one of an application-specific integrated circuit (ASIC) or a field-programmable gate array (FPGA).

16. The method of claim 12 wherein the first and second inputs and output timing constraints are for an individual functional block on an IC instead of for the entire IC.

17. The method of claim 12 wherein the first and second inputs and output timing constraints are for interaction paths between functional blocks on an IC.

18. The system of claim 17 wherein results are used to partition overall IC timing requirements into block timing budgets.

19. The method of claim 12 wherein the synthesizable description is provided as one of Verilog or VHDL format.

20. The method of claim 12 wherein the first input is derived from a .lib model, and converted into one of Verilog or VHDL format.

21. The method of claim 20 wherein a facility is provided for a user to manually refine an automatically-generated model by adding functional detail.

22. The method of claim 12 wherein, as part of the clock specification users define the clocks, their periods, their phase shifts relative to a reference clock, and the nets on the proposed IC design to which a clock is applied.

* * * * *